(12) United States Patent
Baba et al.

(10) Patent No.: US 12,472,940 B2
(45) Date of Patent: Nov. 18, 2025

(54) INFORMATION PROCESSING DEVICE, INFORMATION PROCESSING METHOD, AND STORAGE MEDIUM

(71) Applicant: HONDA MOTOR CO., LTD., Tokyo (JP)

(72) Inventors: Ichiro Baba, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 18/230,752

(22) Filed: Aug. 7, 2023

(65) Prior Publication Data

US 2024/0051526 A1 Feb. 15, 2024

(30) Foreign Application Priority Data

Aug. 10, 2022 (JP) ................................. 2022-127810

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 40/105* (2013.01); *B60W 60/001* (2020.02); *B60W 2556/10* (2020.02)

(58) Field of Classification Search
CPC ......... B60W 2520/10; B60W 2554/40; B60W 2556/10; B60W 30/09; B60W 30/0956;
(Continued)

(56) References Cited

U.S. PATENT DOCUMENTS

2020/0385020 A1 12/2020 Komuro
2022/0234577 A1 7/2022 Baba et al.
2023/0219567 A1* 7/2023 Iwai .................. B60W 60/0011
701/26

FOREIGN PATENT DOCUMENTS

CN 111942378 11/2020
JP 2020-185968 11/2020
(Continued)

OTHER PUBLICATIONS

Japanese Notice of Allowance for Japanese Patent Application No. 2022-127810 dated Jul. 22, 2025.

*Primary Examiner* — Wade Miles
*Assistant Examiner* — Zachary Joseph Wallace
(74) *Attorney, Agent, or Firm* — Amin, Turocy & Watson, LLP

(57) ABSTRACT

An information processing device for generating a trajectory of a moving object includes a storage medium storing computer-readable instructions and a processor connected to the storage medium. The processor executes the computer-readable instructions to recognize a travel environment around the moving object, calculate a risk value to be set for a region surrounding a target located in the recognized travel environment, and generate a travel trajectory of the moving object as a travel trajectory along which a plurality of trajectory points are arranged. The trajectory is generated by executing an iterative process and a current travel trajectory is generated by designating a previous travel trajectory generated at a processing timing before a current processing timing as a reference line and offsetting each of the plurality of trajectory points constituting the reference line in a direction normal to the reference line on the basis of the risk value.

7 Claims, 8 Drawing Sheets

(51) Int. Cl.
*B60W 40/105* (2012.01)
*B60W 60/00* (2020.01)
(58) Field of Classification Search
CPC ........... B60W 30/10; B60W 30/18145; B60W 40/105; B60W 60/001
See application file for complete search history.

(56) References Cited

FOREIGN PATENT DOCUMENTS

| | | |
|---|---|---|
| JP | 2022-113949 | 8/2022 |
| WO | 2020/116265 | 6/2020 |

* cited by examiner

INFORMATION PROCESSING DEVICE, INFORMATION PROCESSING METHOD, AND STORAGE MEDIUM

CROSS-REFERENCE TO RELATED APPLICATION

Priority is claimed on Japanese Patent Application No. 2022-127810, filed Aug. 10, 2022, the content of which is incorporated herein by reference.

FIELD OF THE INVENTION

Background

The present invention relates to an information processing device, an information processing method, and a storage medium.

Description of Related Art

In the related art, technology for generating a travel trajectory of a route along which a moving object travels is known. For example, in PCT International Publication No. WO2020/116265, technology for deciding on a travel trajectory and speed of a host vehicle in accordance with a width of the route along which the host vehicle travels is disclosed.

SUMMARY

However, in the related art, there is a tendency to rely on the recognition accuracy of a runway in an image captured by an in-vehicle camera when a travel trajectory of a moving object is generated. For example, there is a case where a travel trajectory is generated by recognizing markings on both sides of a runway on the basis of a captured image and deriving a center line of the recognized markings in the related art. However, when the moving object travels on a sharp turn or an S-curve, there are cases where the recognition accuracy of the markings on both sides is not sufficient and the travel trajectory cannot be generated.

The present invention has been made in consideration of such circumstances and an objective of the present invention is to provide an information processing device, an information processing method, and a storage medium capable of appropriately generating a travel trajectory of a moving object without excessively depending on the recognition accuracy of a runway based on a captured image.

An information processing device, an information processing method, and a storage medium according to the present invention adopt the following configurations.

(1): According to an aspect of the present invention, there is provided an information processing device for generating a trajectory of a moving object, the information processing device including: a storage medium storing computer-readable instructions; and a processor connected to the storage medium, the processor executing the computer-readable instructions to: recognize a travel environment around the moving object; calculate a risk value to be set for a region surrounding a target located in the recognized travel environment; and generate a travel trajectory of the moving object as a travel trajectory along which a plurality of trajectory points are arranged, wherein the trajectory is generated by executing an iterative process and a current travel trajectory is generated by designating a previous travel trajectory generated at a processing timing before a current processing timing as a reference line and offsetting each of the plurality of trajectory points constituting the reference line in a direction normal to the reference line on the basis of the risk value.

(2): In the above-described aspect (1), the processor generates the current travel trajectory by offsetting each of the plurality of trajectory points constituting the reference line in a direction in which the risk value decreases as the direction normal to the reference line.

(3): In the above-described aspect (1), the target includes a boundary line of a region where the moving object can travel or a physical object that is likely to come into contact with the moving object.

(4): In the above-described aspect (1), the processor generates the travel trajectory when the moving object is traveling at a prescribed speed or lower.

(5): In the above-described aspect (3), the processor generates the travel trajectory when a width smaller than or equal to a prescribed width on a runway of the moving object has been recognized.

(6): In the above-described aspect (1), the processor causes the moving object to travel along the generated travel trajectory.

(7): According to another aspect of the present invention, there is provided an information processing method including: recognizing, by a computer, a travel environment around a moving object so that a trajectory of the moving object is generated; calculating, by the computer, a risk value to be set for a region surrounding a target located in the recognized travel environment; generating, by the computer, a travel trajectory of the moving object as a travel trajectory along which a plurality of trajectory points are arranged; and executing, by the computer, an iterative process to generate a current travel trajectory by designating a previous travel trajectory generated at a processing timing before a current processing timing as a reference line and offsetting each of the plurality of trajectory points constituting the reference line in a direction normal to the reference line on the basis of the risk value.

(8): According to yet another aspect of the present invention, there is provided a computer-readable non-transitory storage medium storing a program for causing a computer to: recognize a travel environment around a moving object so that a trajectory of the moving object is generated; calculate a risk value to be set for a region surrounding a target located in the recognized travel environment; generate a travel trajectory of the moving object as a travel trajectory along which a plurality of trajectory points are arranged; and execute an iterative process to generate a current travel trajectory by designating a previous travel trajectory generated at a processing timing before a current processing timing as a reference line and offsetting each of the plurality of trajectory points constituting the reference line in a direction normal to the reference line on the basis of the risk value.

According to the aspects (1) to (8), a travel trajectory of a moving object can be appropriately generated without excessively depending on the recognition accuracy of a runway based on a captured image.

DESCRIPTION OF EMBODIMENTS

Hereinafter, embodiments of an information processing device, an information processing method, and a storage medium of the present invention will be described with reference to the drawings. In the following description, a vehicle is used as a representative example of a moving object, but the moving object is not limited to a vehicle. The present invention is applicable to any moving objects that autonomously move such as micro-mobility and robots (including those with wheels and those with multi-legged walking capabilities).

[Overall Configuration]

Figure 1:
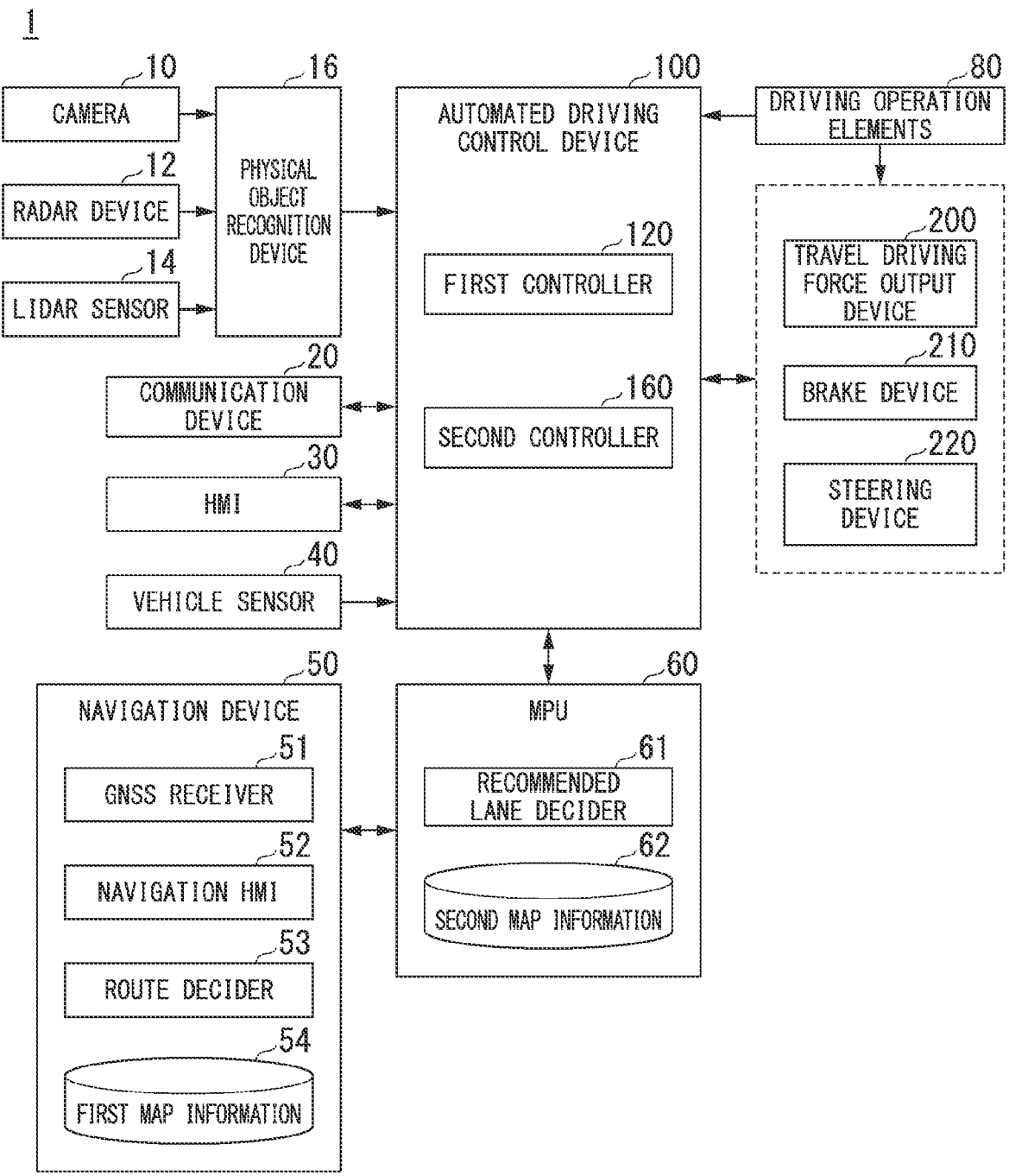
FIG. 1 is a configuration diagram of a vehicle system using a vehicle control device according to an embodiment.

FIG. 1 is a configuration diagram of a vehicle system using a vehicle control device according to an embodiment. A vehicle in which a vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generation unit connected to the internal combustion engine or electric power that is supplied when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. Also, the configuration shown in FIG. 1 is merely an example and some of the components may be omitted or other components may be further added.

For example, the camera 10 is a digital camera using a solid-state imaging element such as a charge-coupled device (CCD) or a complementary metal oxide semiconductor (CMOS). The camera 10 is attached to any location on the vehicle (hereinafter, a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and speed of the physical object in a frequency modulated continuous wave (FM-CW) scheme.

The LIDAR sensor 14 radiates light to the vicinity of the host vehicle M and measures scattered light. The LIDAR sensor 14 detects a distance to an object on the basis of a period of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle located in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 provides an occupant of the host vehicle M with various types of information and receives an input operation from the occupant. The HMI 30 includes various types of display devices, a speaker, a buzzer, a touch panel, a switch, a key, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route decision unit 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decision unit 53 decides on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decision unit 61 and stores second map information 62 in a storage device such as an HDD or a flash memory. The recommended lane decision unit 61 divides the route on the map provided from the navigation device 50 into a plurality of blocks (for example, divides the route every 100 [m] in a travel direction of the vehicle), and decides on a recommended lane for each block with reference to the second map information 62. The recommended lane decision unit 61 decides in what lane numbered from the left the vehicle will travel. The recommended lane decision unit 61 decides on the recommended lane so that the host vehicle M can travel along a reasonable route for traveling to a branching destination when there is a branch point on the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

For example, the driving operation elements 80 include an accelerator pedal, a brake pedal, a shift lever, a steering wheel, a variant steering wheel, a joystick, and other operation elements. A sensor configured to detect an amount of operation or the presence or absence of an operation is attached to the driving operation element 80 and a detection result of the sensor is output to the automated driving control device 100 or some or all of the travel driving force output device 200, the brake device 210, and the steering device 220.

The automated driving control device 100 is an example of the vehicle control device. The automated driving control device 100 includes, for example, a first control unit 120 and a second control unit 160. Each of the first control unit 120 and the second control unit 160 is implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device.

Figure 2:
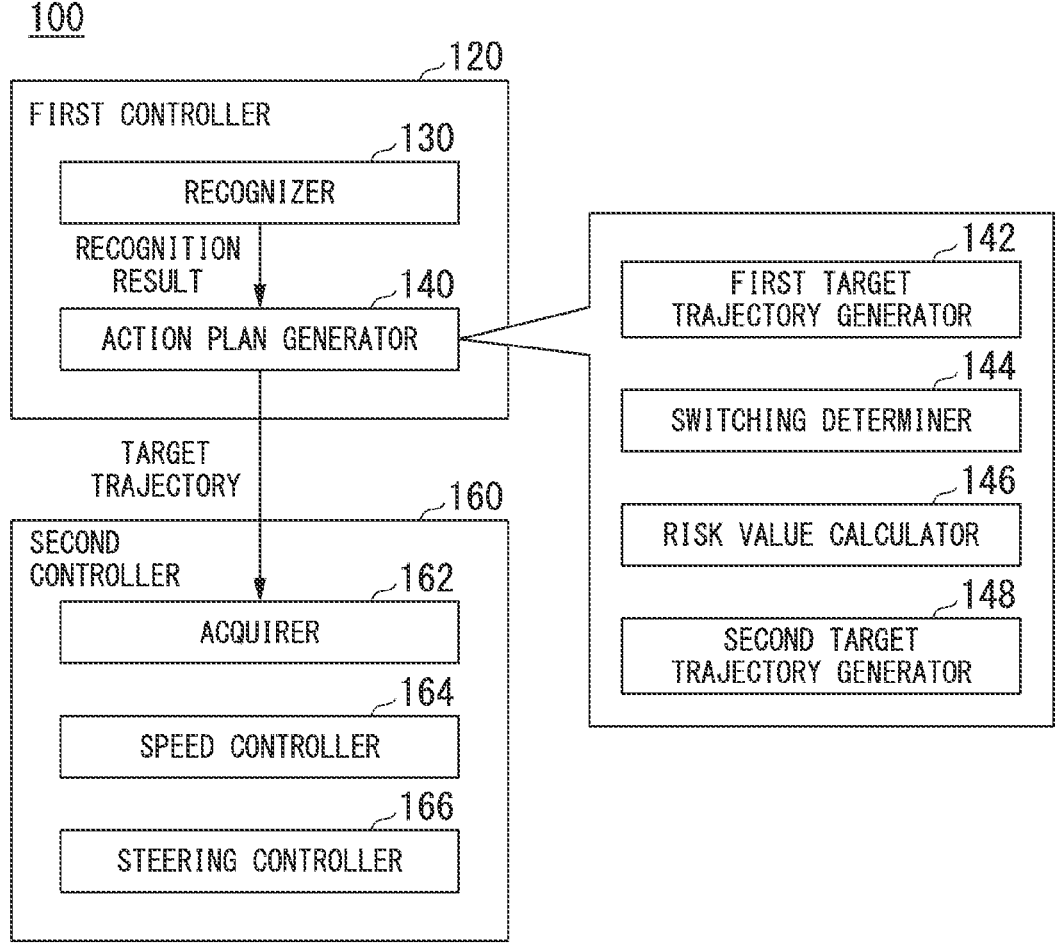
FIG. 2 is a functional configuration diagram of a first control unit and a second control unit.

FIG. 2 is a functional configuration diagram of the first control unit and the second control unit. The first control unit 120 includes, for example, a recognition unit 130 and an action plan generation unit 140. For example, the first control unit 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both recognitions. Thereby, the reliability of automated driving is secured.

The recognition unit 130 recognizes states of positions, speeds, acceleration, and the like of targets near the host vehicle M on the basis of information input from the camera 10, the radar device 12, and the LIDAR sensor 14 via the physical object recognition device 16. The targets include both a stationary physical object and a moving physical object. For example, the position of the target is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by an expressed region.

In the present embodiment, it is assumed that the recognition unit 130 recognizes a boundary line (for example, a road marking, a shoulder, a curb, a median, a guardrail, or the like) of a region where the host vehicle M can travel or a certain physical object (for example, a pedestrian, another vehicle, or the like) that is likely to come into contact with the host vehicle M on the basis of at least an image representing a surrounding situation of the host vehicle M captured by the camera 10. The recognition unit 130 recognizes left and right road markings as a plurality of items of point group data as an example and recognizes a width by calculating a distance between the point groups constituting the left and right road markings.

The action plan generation unit 140 includes, for example, a first target trajectory generation unit 142, a switching determination unit 144, a risk calculation unit 146, and a second target trajectory generation unit 148. Some or all of the first target trajectory generation unit 142, the switching determination unit 144, the risk calculation unit 146, and the second target trajectory generation unit 148 may be included in the recognition unit 130. The second target trajectory generation unit 148 is an example of a "trajectory generation unit." A combination of the switching determination unit 144, the risk calculation unit 146, and the second target trajectory generation unit 148 is an example of an "information processing device." Also, the "information processing device" may include the second control unit 160. In this case, the "information processing device" is a "vehicle control device."

The action plan generation unit 140 generates a future target trajectory along which the host vehicle M will automatically travel (independently of the driver's operation) so that the host vehicle M can generally travel in the recommended lane determined by the recommended lane decision unit 61 and further cope with a surrounding situation of the host vehicle M. The action plan generation unit 140 generates a target trajectory using the first target trajectory generation unit 142 or the second target trajectory generation unit 148 in accordance with a state of the host vehicle M and the surrounding situation recognized by the recognition unit 130. Details of this will be described below.

For example, the target trajectory is represented by sequentially arranging (connecting) points (trajectory points) at which a representative point (for example, a center of a front end, a center of gravity, a center of a rear axle, or the like) of the host vehicle M is required to arrive for each prescribed traveling distance (for example, about several meters [m]) in a longitudinal direction of a road. A target speed and target acceleration for each prescribed sampling time (for example, about 0.x [sec] where x is a decimal number) are assigned to the target trajectory. The trajectory point may be a position at which the host vehicle M is required to arrive at the sampling time for each prescribed sampling time. In this case, information of the target speed or the target acceleration is represented by an interval between the trajectory points.

The second control unit 160 controls the travel driving force output device 200, the brake device 210, and the steering device 220 so that the host vehicle M passes along the target trajectory generated by the action plan generation unit 140 at the scheduled times.

The second control unit 160 includes, for example, an acquirer 162, a speed control unit 164, and a steering control unit 166. The acquirer 162 acquires information of a target trajectory (trajectory points) generated by the action plan generation unit 140 and causes a memory (not shown) to store the information. The speed control unit 164 controls the travel driving force output device 200 or the brake device 210 on the basis of a speed element associated with the target trajectory stored in the memory. The steering control unit 166 controls the steering device 220 in accordance with a degree of curvature of the target trajectory stored in the memory. The processes of the speed control unit 164 and the steering control unit 166 are implemented by, for example, a combination of feedforward control and feedback control. As an example, the steering control unit 166 executes feedforward control according to the curvature of the road in front of the host vehicle M and feedback control based on deviation from the target trajectory in combination.

The travel driving force output device 200 outputs a travel driving force (torque) for enabling traveling of the vehicle to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second control unit 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second control unit 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. Also, the brake device 210 may be an electronically controlled hydraulic brake device configured to control an actuator in accordance with information input from the second control unit 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second control unit 160 or the information input from the driving operation element 80 to change the direction of the steerable wheels.

[Generation of Target Trajectory]

A target trajectory generation method will be described in more detail below.

The first target trajectory generation unit 142 generates a target trajectory of the host vehicle M when the vehicle speed of the host vehicle M detected by the vehicle sensor 40 is higher than or equal to a prescribed speed and the width of the runway of the host vehicle M recognized by the recognition unit 130 is larger than or equal to a prescribed width. These conditions are examples. For example, the first target trajectory generation unit 142 may generate a target trajectory of the host vehicle M when any one of these conditions is satisfied. Also, for example, when the recognition unit 130 does not recognize a particular type of runway (such as a sharp turn or an S-curve) in the travel direction of the host vehicle M, the first target trajectory generation unit 142 may generate a target trajectory of the host vehicle M.

Figure 3:
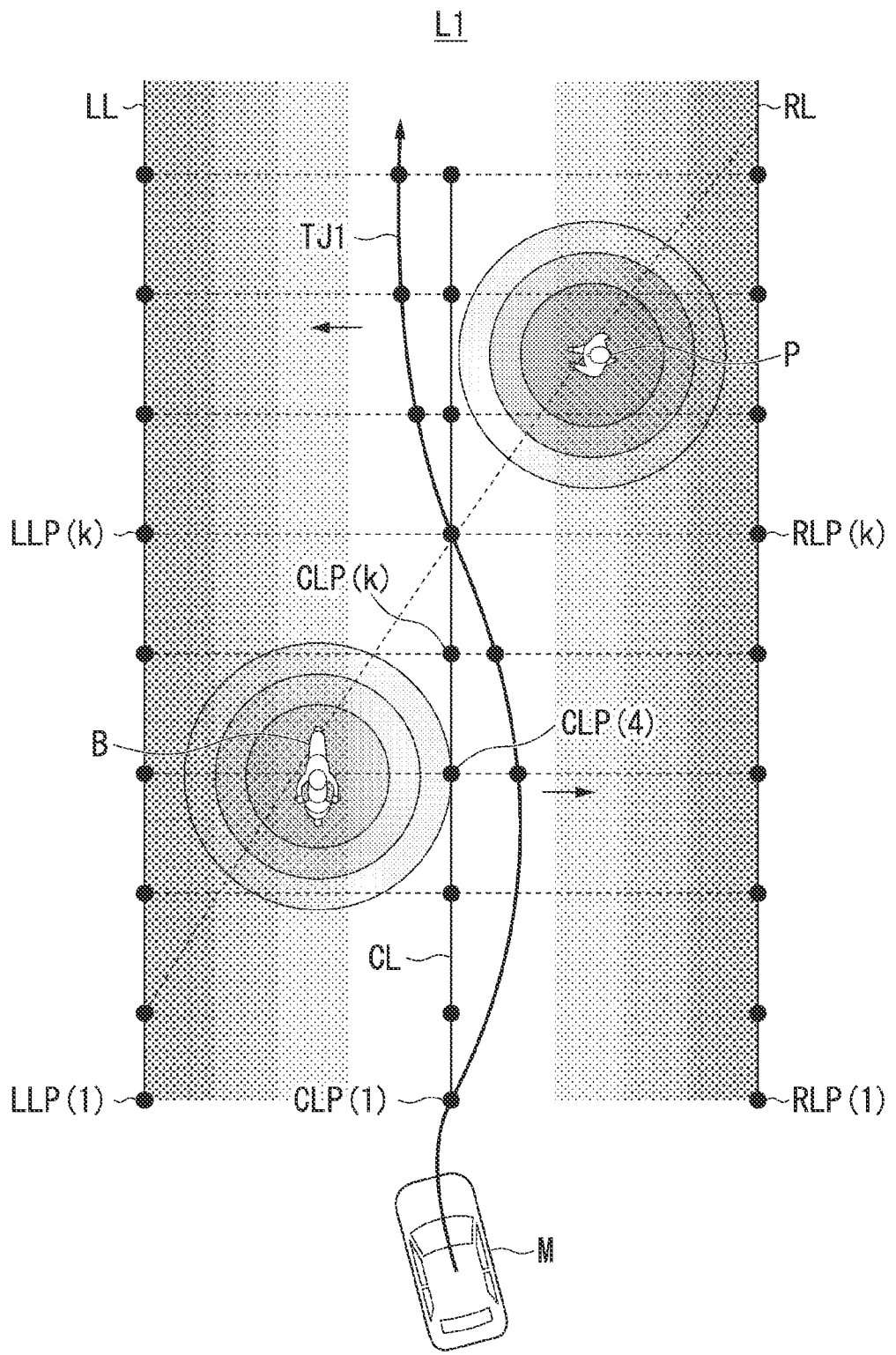
FIG. 3 is a diagram for describing a method in which a first target trajectory generation unit generates a target trajectory.

FIG. 3 is a diagram for describing a method in which the first target trajectory generation unit 142 generates a target trajectory. In FIG. 3, reference signs LL and RL denote a left road marking and a right road marking recognized by the recognition unit 130, respectively, reference signs LLP and RLP denote point groups constituting the left road marking LL and the right road marking RL, respectively, and reference signs P and B denote a pedestrian and a motorcycle located in a travel lane L1 of the host vehicle M, respectively. As shown in FIG. 3, the point group LLP constituting the left road marking LL and the point group RLP constituting the right road marking RL are arranged at prescribed intervals from a starting point LLP(1) of the left road marking LL and a starting point RLP(1) of the right road marking RL.

The first target trajectory generation unit 142 first performs a process of associating (pairing) points LLP(k) constituting the point group LLP of the left road marking LL and points RLP(k) constituting the point group RLP of the right road marking RL on the basis of an order from the starting point and calculates a center point CLP(k) thereof. The first target trajectory generation unit 142 obtains a center line CL (reference line) serving as a reference for generating the target trajectory by connecting the calculated center point CLP(k).

Next, the first target trajectory generation unit 142 derives a larger index value (larger risk value) that becomes negative when the target recognized by the recognition unit 130 is closer to it, for each point CLP(k) constituting the reference line CL. In FIG. 3, a dark-colored portion represents a large risk value and a light-colored portion represents a small risk value. Although a positive value indicates "disapproval" and a near-zero value indicates "affirmative" in the present embodiment, the relationship may be reversed. For example, in the case of FIG. 3, a point CLP(4) closer to the motorcycle, which is one of the targets recognized by the recognition unit 130, has a larger calculated risk value than the other points CLP(k).

When the first target trajectory generation unit 142 corrects the reference line CL so that a total risk value is smaller than a threshold value if a sum of calculated risk values (or a maximum value among the calculated risk values) is larger than or equal to the threshold value when a risk value is calculated for each point CLP(k) constituting the reference line CL. More specifically, the first target trajectory generation unit 142 corrects the reference line CL by offsetting the point CLP(k) constituting the reference line CL in a direction normal to the reference line CL and calculates the risk value again. The first target trajectory generation unit 142 sets the corrected reference line CL obtained when the sum of the calculated risk values is smaller than the threshold value as a target trajectory TJ1.

Also, in order to search for an offset amount that makes the sum of the calculated risk values smaller than the threshold value, the first target trajectory generation unit 142 may use simultaneous perturbation optimization (simultaneous perturbation stochastic approximation (SPSA)), which is a type of probabilistic gradient method using random variables. Also, a case where the reference line CL obtained by connecting the points CLP(k) is a polygonal chain unlike the situation of FIG. 3 is conceivable. However, in this case, because the normal direction is not uniquely determined, the first target trajectory generation unit 142 may fit a curve to the polygonal chain using, for example, a least squares method, and offset the point CLP(k) on the basis of the normal direction of the fitted curve. Also, for example, one-half of an angle formed by the line segments constituting the polygonal chain may be defined as the normal direction.

In this way, the first target trajectory generation unit 142 obtains the target trajectory TJ1 by pairing the points LLP(k) and RLP(k) of the point groups of the left road marking LL and the right road marking RL recognized by the recognition unit 130, calculating the center point CLP(k), connecting the calculated center point CLP(k) to acquire the reference line CL, and correcting the reference line CL on the basis of the risk value around the host vehicle M.

However, when a target trajectory is generated in such a method, it is necessary to pair points of the left road marking LL and the right road marking RL in advance and high accuracy is required for recognizing the runway based on the image captured by the camera 10. However, for example, in a runway region (in other words, a low-speed travel region) where a road structure changes abruptly, such as a sharp turn or an S-curve, or in a narrow runway region, it is difficult to obtain the recognition accuracy necessary for executing the above-described method. As a result, the target trajectory may not be obtained.

As background for this situation, the switching determination unit 144 determines whether the vehicle speed of the host vehicle M is lower than or equal to a prescribed speed while the host vehicle M is traveling on the basis of an output of the vehicle sensor 40 or whether or not a width smaller than or equal to a prescribed width on the runway of the host vehicle M has been recognized on the basis of a width recognized by the recognition unit 130. The switching determination unit 144 causes the second target trajectory generation unit 148 to generate the target trajectory instead of the first target trajectory generation unit 142 when it is determined that a width smaller than or equal to the prescribed width on the runway of the host vehicle M has been recognized on the basis of whether the vehicle speed of the host vehicle M is lower than or equal to the prescribed speed while the host vehicle M is traveling or the width recognized by the recognition unit 130.

Figure 4:
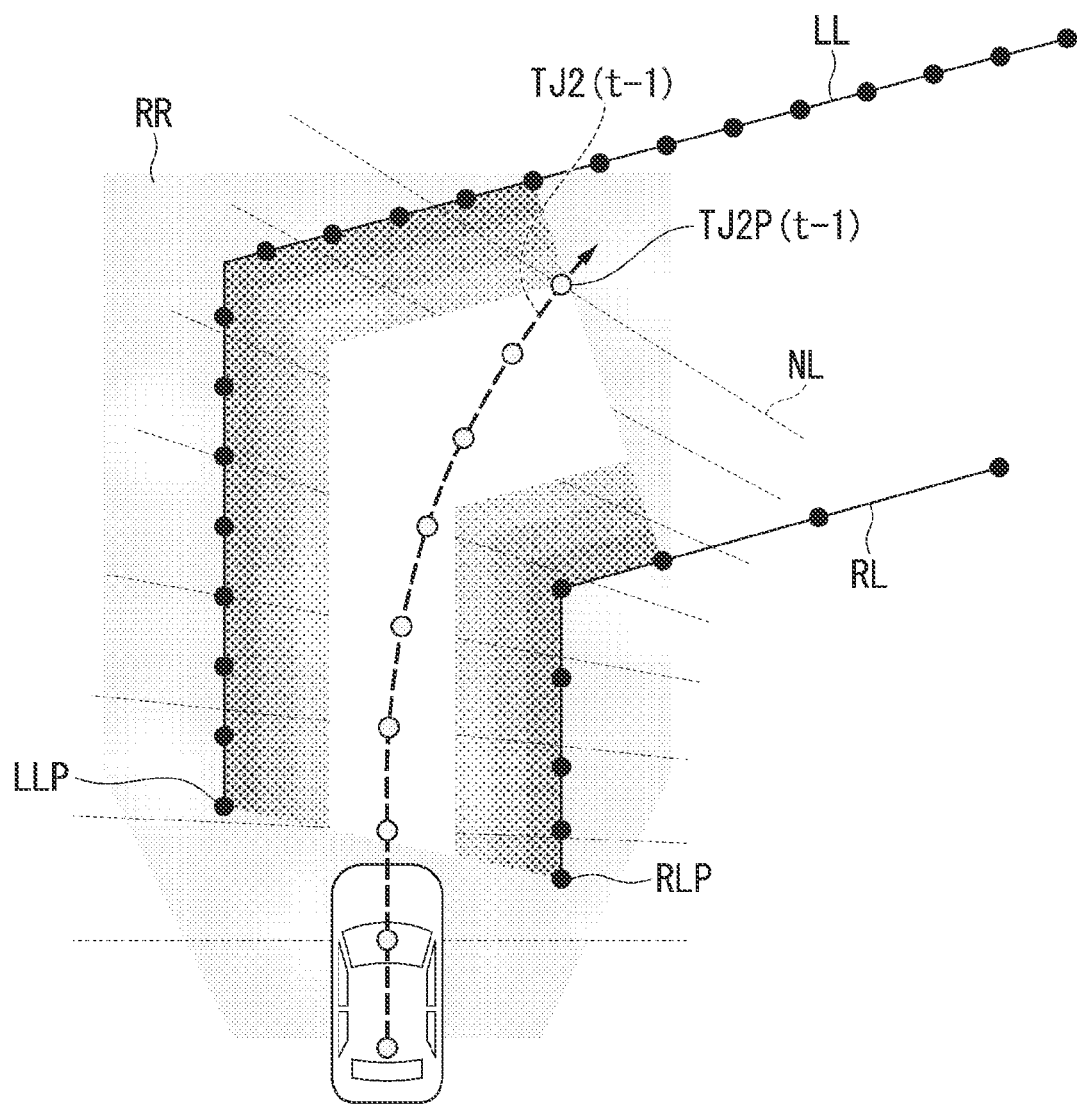
FIG. 4 is a diagram for describing a method in which a second target trajectory generation unit generates a target trajectory.

FIG. 4 is a diagram for describing a method in which the second target trajectory generation unit 148 generates a target trajectory. In FIG. 4, reference sign TJ2 denotes a target trajectory generated by the second target trajectory generation unit 148, reference sign TJ2P denotes trajectory points constituting the target trajectory TJ2, and reference sign RR denotes a recognition range of a travel environment of the host vehicle M recognized by the recognition unit 130 on the basis of at least images captured by the camera 10. A target trajectory TJ2($t$−1) in FIG. 4 is a target trajectory generated one cycle before a currently generated target trajectory TJ2($t$).

First, when a current target trajectory TJ2($t$) is generated, the second target trajectory generation unit 148 sets a target trajectory TJ2($t$−1) generated in a previous cycle as a reference line. When the second target trajectory generation unit 148 generates the target trajectory for the first time, a target trajectory TJ1($t$−1) generated by the first target trajectory generation unit 142 may be used as the previous target trajectory TJ2($t$−1) or the target trajectory may be generated in a method similar to that of the first target trajectory generation unit 142 only at a first timing.

The risk calculation unit 146 calculates a risk value of a target set in the normal direction of each trajectory point TJ2P(t−1) on the reference line set by the second target trajectory generation unit 148 and located in the recognition range RR. A risk value calculation method is similar to the method of the first target trajectory generation unit 142 described with reference to FIG. 3. A larger value (negative value) is calculated when the recognized target is closer to it. The second target trajectory generation unit 148 generates the current target trajectory TJ2($t$) by offsetting each trajectory point TJ2P(t−1) in a direction in which the risk value decreases on the basis of the risk value calculated by the risk calculation unit 146.

The second target trajectory generation unit 148 similarly generates the next target trajectory TJ2($t$+1) by setting the generated current target trajectory TJ2($t$) as the next reference line. The second target trajectory generation unit 148 iteratively executes the above-described target trajectory generation process until the switching determination unit 144 determines that the vehicle speed of the host vehicle M is higher than or equal to the prescribed speed and the width of the runway is larger than or equal to the prescribed width. When it is determined that the vehicle speed of the host vehicle M is higher than or equal to the prescribed speed and the width of the runway is larger than or equal to the prescribed width, the switching determination unit 144 causes the first target trajectory generation unit 142 to execute the target trajectory generation process.

Figure 5:
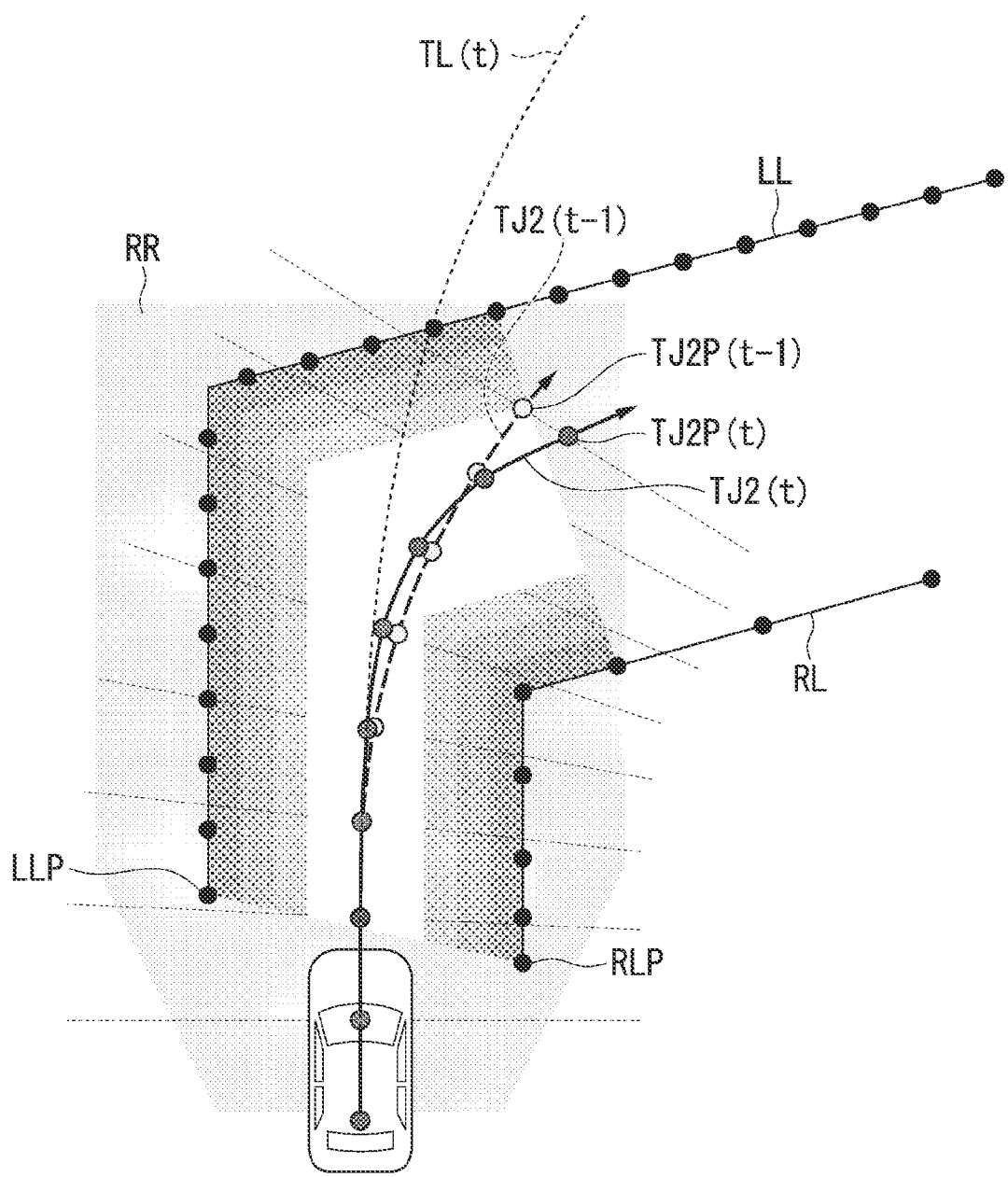
FIG. 5 is another diagram for describing the method in which the second target trajectory generation unit generates the target trajectory.

FIG. 5 is another diagram for describing the method in which the second target trajectory generation unit 148 generates the target trajectory. In FIG. 5, the current target trajectory TJ2($t$) is obtained by offsetting each point TJ2P (t−1) of the reference line TJ2($t$−1) in the normal direction so that the risk value decreases. As can be seen from FIG. 5, the reference point TJ2P(t−1) is closer to the left road marking LL than to the right road marking RL. Thus, the risk calculation unit 146 calculates a risk value for the left side that is larger than a risk value for the right side with respect to the normal direction of the reference point TJ2P(t−1) and the second target trajectory generation unit 148 obtains a current trajectory point TJ2P(t) by offsetting the reference point TJ2P(t−1) to the right side. Also, in FIG. 5, a dotted line TL indicates a curve for defining a turning angle of the host vehicle M. The curve TL is defined as an arc along several trajectory points on the host vehicle M side among the points TJ2P(t) of the target trajectory TJ2($t$). The second control unit 160 causes the host vehicle M to turn along the curve TL.

As described above, unlike the first target trajectory generation unit 142, the second target trajectory generation unit 148 generates the current target trajectory TJ2($t$) using the previous target trajectory TJ2($t$−1) as a reference line without pairing each point LLP(k) of the left road marking LL and each point RLP(k) of the right road marking RL. That is, the second target trajectory generation unit 148 can also generate the current target trajectory TJ2($t$) on a runway where it is difficult to recognize the road markings on both sides with equal accuracy, such as a sharp turn or an S-curve. Thereby, the travel trajectory of the moving object can be appropriately generated without excessively depending on the recognition accuracy of the runway based on the captured image.

Although a case where the second target trajectory generation unit 148 offsets the reference line TJ2($t$−1) once has been described above, the present invention is not limited to such a configuration. For example, the second target trajectory generation unit 148 may calculate the risk value of each trajectory point on the current target trajectory TJ2($t$) obtained by offsetting the reference line TJ2($t$−1) and offset the current target trajectory TJ2($t$) again until it reaches below a threshold value when a sum of calculated risk values (or a maximum value among the calculated risk values) is larger than or equal to the threshold value.

Figure 6:
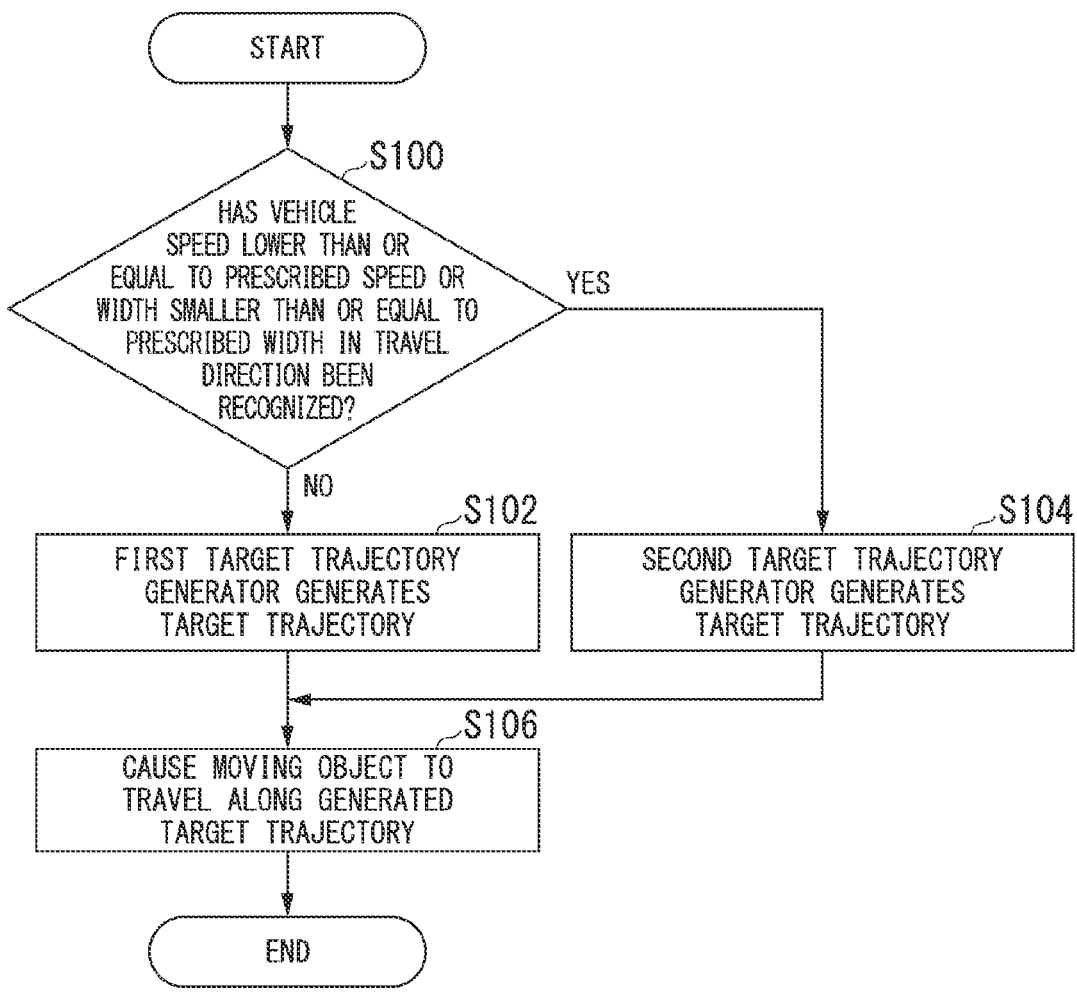
FIG. 6 is a flowchart showing an example of a flow of a process executed by the vehicle control device according to the embodiment.

FIG. 6 is a flowchart showing an example of a flow of a process executed by the vehicle control device according to the embodiment. The process of the flowchart shown in FIG. 6 is iteratively executed in a prescribed cycle while the host vehicle M is traveling.

First, the switching determination unit 144 determines whether or not the vehicle speed of the host vehicle M is lower than or equal to a prescribed speed or whether or not a width smaller than or equal to a prescribed width in the travel direction has been recognized (step S100). When it is determined that the vehicle speed of the host vehicle M is lower than or equal to the prescribed speed or that the width smaller than the prescribed width in the travel direction has not been recognized, the first target trajectory generation unit 142 generates a target trajectory (step S102).

On the other hand, when it is determined that the vehicle speed of the host vehicle M is lower than or equal to the prescribed speed or that the width of the travel direction smaller than or equal to the prescribed width has been recognized, the second target trajectory generation unit 148 generates the target trajectory (step S104). Subsequently, the second control unit 160 causes the host vehicle M to travel along the generated target trajectory (step S106). Thereby, the process of the present flowchart ends.

Figure 7:
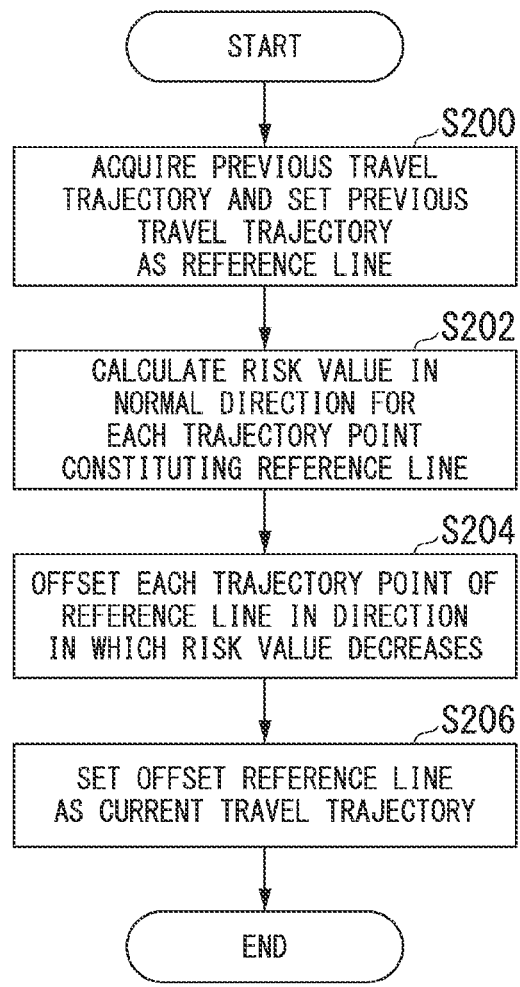
FIG. 7 is a flowchart showing an example of a flow of a process executed by a risk calculation unit and a second target trajectory generation unit.

FIG. 7 is a flowchart showing an example of a flow of a process executed by the risk calculation unit 146 and the second target trajectory generation unit 148. The process of the flowchart shown in FIG. 7 is executed in step S104 of the flowchart of FIG. 6.

First, the second target trajectory generation unit 148 acquires a travel trajectory generated in a previous cycle and sets the travel trajectory as a reference line (step S200). Subsequently, the risk calculation unit 146 calculates a risk value in a direction normal to the reference line for each trajectory point constituting the set reference line (step S202).

Subsequently, the second target trajectory generation unit 148 offsets each trajectory point in the direction normal to the reference line as a direction in which the calculated risk value decreases (step S204). The second target trajectory generation unit 148 sets the offset reference line as a current travel trajectory (step S206). Thereby, the process of the present flowchart ends.

Figure 8:
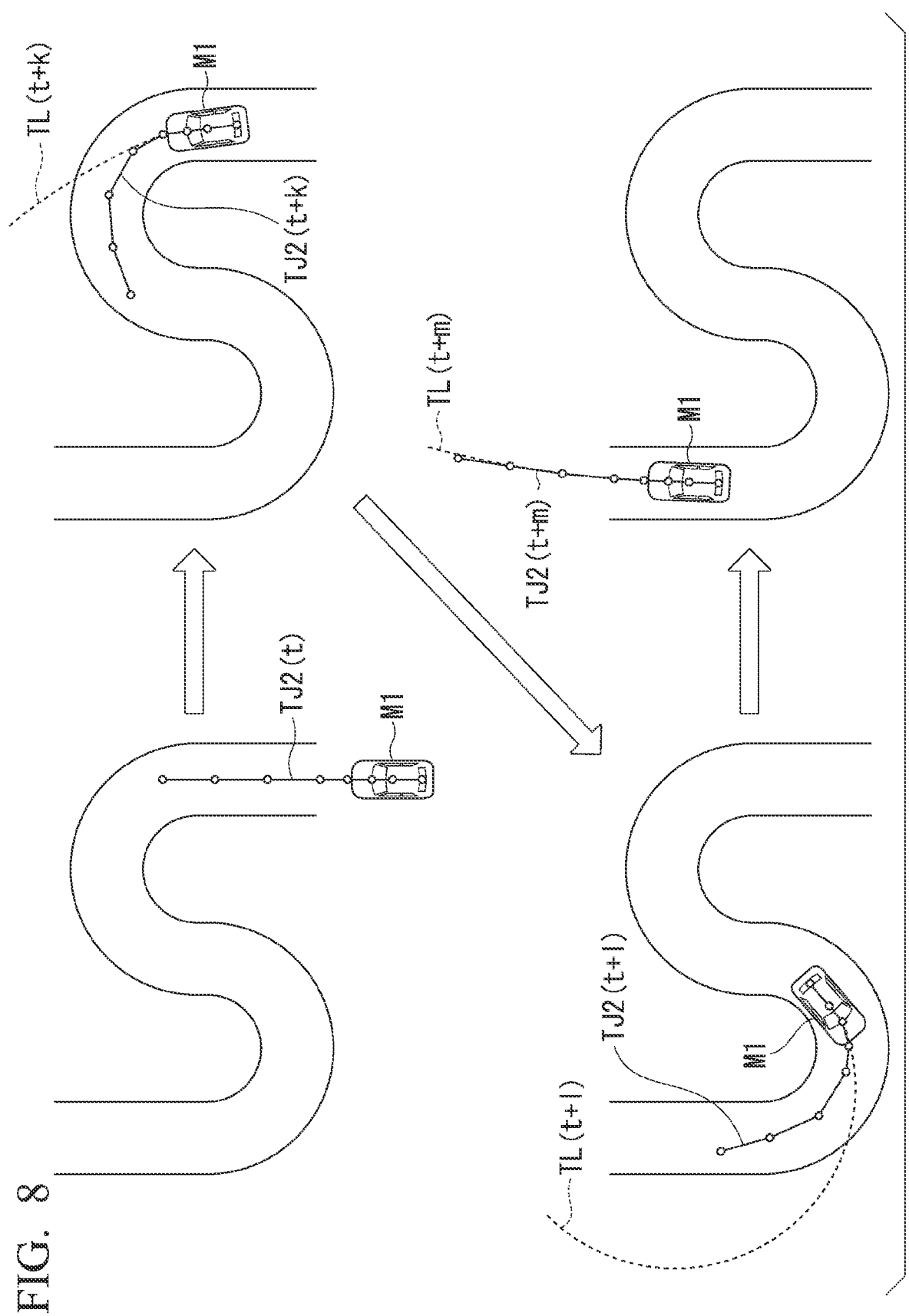
FIG. 8 is a diagram showing results of executing a target trajectory generation simulation according to the embodiment.

Also, the inventor of the present application performed the simulation of an operation of the present invention. FIG. 8 is a diagram showing a result of executing the simulation of target trajectory generation according to the embodiment. FIG. 8 shows a state in which a moving object M1 implementing a function of the second target trajectory generation unit 148 travels along an S-curve. As shown in FIG. 8, it was found that the moving object M1 implementing the function of the second target trajectory generation unit 148 could also smoothly travel in the S-curve where it was difficult to pair points of the left and right road markings in a target trajectory generation process of the first target trajectory generation unit 142.

According to the present embodiment described above, a current travel trajectory is generated by designating a previous travel trajectory generated at a processing timing before a current processing timing as a reference line and offsetting each of a plurality of trajectory points constituting the reference line in a direction normal to the reference line on the basis of a risk value set for a region surrounding a target located in a recognized travel environment. Thereby, a travel trajectory of the moving object can be appropriately generated without excessively depending on the recognition accuracy of a runway based on a captured image.

The embodiment described above can be represented as follows.

An information processing device including:
  a storage medium storing computer-readable instructions; and
  a processor connected to the storage medium, the processor executing the computer-readable instructions to:
  recognize a travel environment around a moving object so that a trajectory of the moving object is generated;
  calculate a risk value to be set for a region surrounding a target located in the recognized travel environment;
  generate a travel trajectory of the moving object as a travel trajectory along which a plurality of trajectory points are arranged; and
  execute an iterative process to generate a current travel trajectory by designating a previous travel trajectory generated at a processing timing before a current processing timing as a reference line and offsetting each of the plurality of trajectory points constituting the reference line in a direction normal to the reference line on the basis of the risk value.

Although modes for carrying out the present invention have been described above using embodiments, the present invention is not limited to the embodiments and various modifications and substitutions can also be made without departing from the scope and spirit of the present invention.

What is claimed is:

1. An information processing device for generating a trajectory of a moving object, the information processing device comprising:
  a storage medium storing computer-readable instructions; and
  a processor connected to the storage medium, the processor executing the computer-readable instructions to:
  recognize a travel environment around the moving object;
  calculate a risk value to be set for a region surrounding a target located in the recognized travel environment; and generate a travel trajectory of the moving object as a travel trajectory along which a plurality of trajectory points are arranged, wherein the travel trajectory is generated by switching between: a first trajectory generation method involving paring each point of a point group constituting a left road marking in the travel environment and each point of a point group constituting a right road marking in the travel environment in order; and a second trajectory generation method of generating a current travel trajectory by designating a previous travel trajectory generated at a processing timing before a current processing timing as a reference line and offsetting each of the plurality of trajectory points constituting the reference line in a direction normal to the reference line on the basis of the risk value.

2. The information processing device according to claim 1, wherein the processor generates the current travel trajectory by offsetting each of the plurality of trajectory points constituting the reference line in a direction in which the risk value decreases as the direction normal to the reference line.

3. The information processing device according to claim 1, wherein the target includes a boundary line of a region where the moving object can travel or a physical object that is likely to come into contact with the moving object.

4. The information processing device according to claim 1, wherein the processor causes the moving object to travel along the generated travel trajectory.

5. An information processing method comprising:
recognizing, by a computer, a travel environment around a moving object so that a trajectory of the moving object is generated;
calculating, by the computer, a risk value to be set for a region surrounding a target located in the recognized travel environment;
generating, by the computer, a travel trajectory of the moving object as a travel trajectory along which a plurality of trajectory points are arranged; and
executing, by the computer, switching between: a first trajectory generation method involving paring each point of a point group constituting a left road marking in the travel environment and each point of a point group constituting a right road marking in the travel environment in order; and a second trajectory generation method of generating a current travel trajectory by designating a previous travel trajectory generated at a processing timing before a current processing timing as a reference line and offsetting each of the plurality of trajectory points constituting the reference line in a direction normal to the reference line on the basis of the risk value.

6. A computer-readable non-transitory storage medium storing a program for causing a computer to:
recognize a travel environment around a moving object so that a trajectory of the moving object is generated;
calculate a risk value to be set for a region surrounding a target located in the recognized travel environment;
generate a travel trajectory of the moving object as a travel trajectory along which a plurality of trajectory points are arranged; and
execute switching between: a first trajectory generation method involving paring each point of a point group constituting a left road marking in the travel environment and each point of a point group constituting a right road marking in the travel environment in order; and a second trajectory generation method of generating a current travel trajectory by designating a previous travel trajectory generated at a processing timing before a current processing timing as a reference line and offsetting each of the plurality of trajectory points constituting the reference line in a direction normal to the reference line on the basis of the risk value.

7. The information processing device according to claim 1, wherein when a speed of the moving object is higher than a prescribed speed and a width of a runway of the moving object is larger than a prescribed width, the processor executes the first trajectory generation method by executing the paring, calculating center points between points of the left road marking and the right road marking, connecting the center points to generate a center line serving as a reference line, and offsetting points constituting the reference line in a direction normal to the reference line on the basis of the risk value to generate the travel trajectory, whereas when the speed of the moving object is lower than or equal to the prescribed speed or the width of the runway of the moving object is smaller than or equal to the prescribed width, the processor executes the second trajectory generation method.

* * * * *